(12) United States Patent
Kusters et al.

(10) Patent No.: US 7,383,466 B2
(45) Date of Patent: Jun. 3, 2008

(54) METHOD AND SYSTEM OF PREVIEWING A VOLUME REVERT OPERATION

(75) Inventors: Norbert P. Kusters, Redmond, WA (US); Behnam Fathi, Bellevue, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 11/032,732

(22) Filed: Jan. 10, 2005

(65) Prior Publication Data

US 2006/0155784 A1 Jul. 13, 2006

(51) Int. Cl.
*G06F 11/00* (2006.01)
(52) U.S. Cl. .............. 714/19; 714/6; 714/15; 714/16; 714/20; 707/202; 707/203
(58) Field of Classification Search ............ 714/6, 714/15, 16, 19, 20; 707/202, 203
See application file for complete search history.

(56) References Cited

U.S. PATENT DOCUMENTS

| 7,222,233 B1* | 5/2007 | Rubin ............... 713/168 |
| 2002/0049883 A1* | 4/2002 | Scheider et al. ........... 711/100 |
| 2005/0251506 A1* | 11/2005 | McCauley et al. ............ 707/2 |

* cited by examiner

*Primary Examiner*—Robert W. Beausoliel
*Assistant Examiner*—Charles Ehne
(74) *Attorney, Agent, or Firm*—Workman Nydegger

(57) ABSTRACT

Described is a revert preview mechanism, which gives the user a chance to temporarily remount a storage volume with the contents of a shadow copy, and then evaluate the computer system as if reverted, including allowing full I/O read and write operations to the storage volume. A temporary storage location is provided to cache data writes. Read requests are read back from the temporary storage location if the corresponding volume location has been written, or are read back from the shadow copy of the volume if not written since the revert preview operation began. In the case of a revert preview of the boot volume, an API is used to specify a correct shadow copy instance of the system registry hive, which needs to be loaded following reboot, but before the shadow copy driver is loaded. Use of the API loads the correct instance on the next reboot.

18 Claims, 5 Drawing Sheets

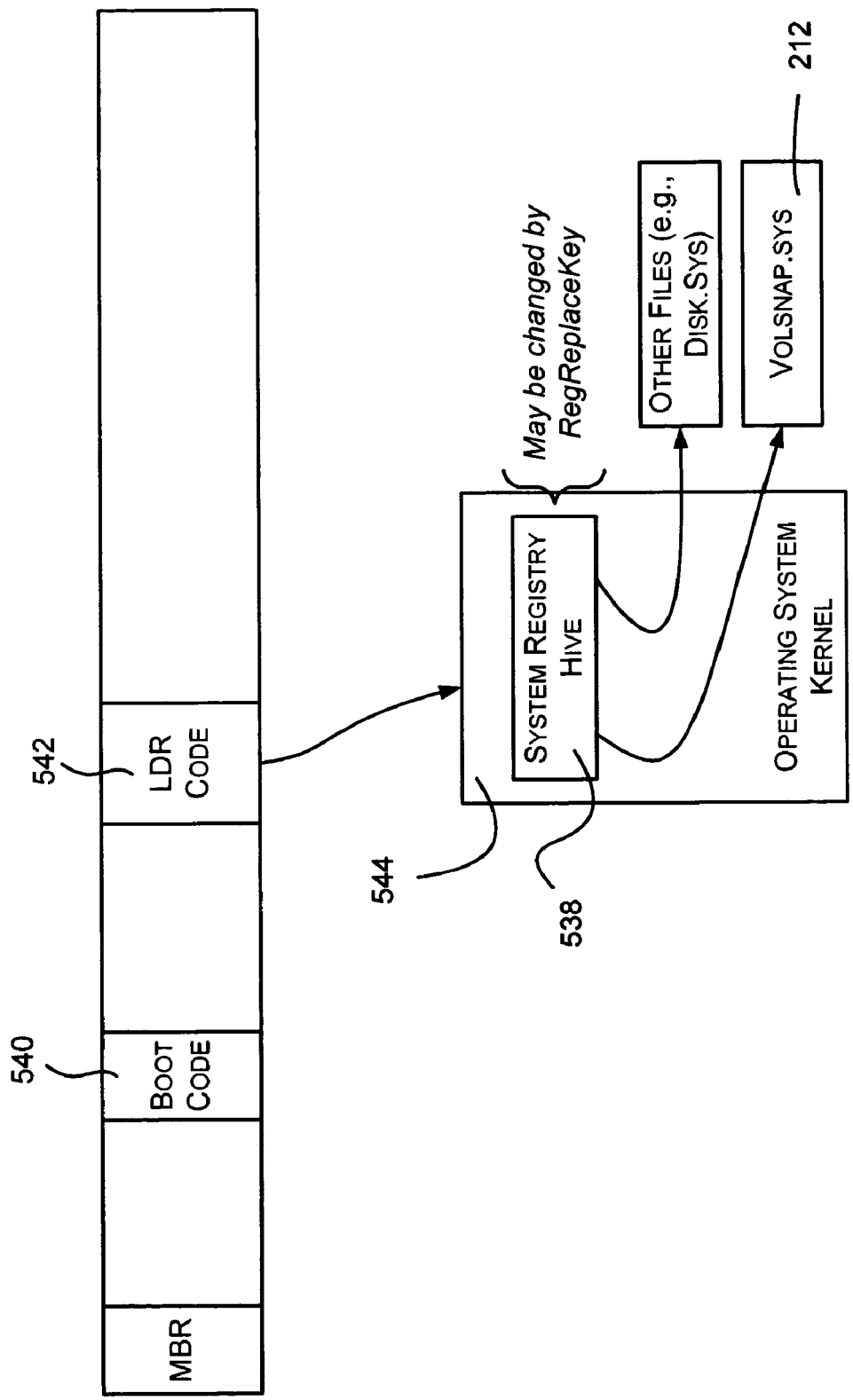

US 7,383,466 B2

METHOD AND SYSTEM OF PREVIEWING A VOLUME REVERT OPERATION

FIELD OF THE INVENTION

The invention relates generally to computer systems, and more particularly to computer storage volumes.

BACKGROUND

In contemporary computing, there are many reasons that a storage volume, which may be the machine's boot volume, may be exhibiting undesirable behavior. For example, as application programs, software components, driver components and so on continue to increase in complexity, problems may result from improper interactions between two or more software programs and/or components that do not work well together. In other situations, files may become corrupted, and there may be a complex collection of corrupted files. Still further, there may be one or more files stored on a storage volume that are infected with a computer virus, causing problems.

One way to solve file-related computer problems is to essentially go back in time and restore the storage volume to a state in which the computer system was operating properly. For example, a shadow copy, or snapshot, is essentially a logical copy of the information stored on a volume at a particular instant in time. To restore to the previous state, the entire volume need not be copied, but instead, changes are persisted from various snapshot points forward, in a way that does not allow new data to overwrite the snapshotted data, whereby the shadow copy can be recreated from the former data. U.S. Pat. No. 6,651,075, assigned to the assignee of the present invention and hereby incorporated by reference, describes one such shadowing mechanism, in which allocation units stored in one or more differential files and the base volume are located, in order and as needed, to recreate an earlier volume at a particular snapshot time.

Shadow copies of a volume are read-only, and allow a user to select one for viewing a volume state as it was at a corresponding snapshot time. In the event that a user locates a particular shadow copy volume to which the user wants to permanently return, such as a shadow copy that solves a volume-related problem (e.g., the most recent shadow copy that was made prior to copying or installing some file or set of files that caused the problem), the user may choose to permanently change the state of the volume back to the state of a selected shadow copy. This operation essentially allows a user to start over from an earlier state of the volume, and is referred to as a "revert" operation.

However, performing a revert operation can be a lengthy procedure. Moreover, many revert providers do not provide "undo" revert capabilities, as doing so undesirably consumes a great deal of free disk space, (assuming enough free disk space is even available for a revert undo). As a result, a user that may want to perform a revert operation has to prepare to wait a possibly significant amount of time, and has to risk permanently losing the current volume's contents, as well as risk permanently losing any shadow copies that are more recent than the one to which the user is reverting.

What is needed is a system and method that lets the user evaluate the consequences of a revert operation without committing to a full revert operation, yet do so in a manner that does not consume significant amounts of free disk space. The system and method should be relatively fast compared to a full revert operation.

SUMMARY OF THE INVENTION

Briefly, the present invention is directed towards a system and method that provides a revert preview mechanism, which gives the user a chance to temporarily remount a storage volume with the contents of a shadow copy, and then try out the computer system with the temporarily reverted volume to see if the system will behave correctly, or at least behave better. The simulated revert is not merely a read-only viewing tool, but instead allows for full I/O read and write operations to the file system, thereby improving on existing shadow copy technology.

To allow for writes, writes directed to the volume are redirected to a temporary storage location. Reads are read back from the temporary storage location if the corresponding volume location has been changed during the revert preview operation by a previous write, or are read back from the volume shadow copy if not written since the revert preview operation began. The revert preview operation is near instantaneous, although in the case of a revert preview of the boot volume, the user is required to reboot in order to recreate the volume and system state, including the state of the system hive of the registry. Significantly, unlike existing revert programs, a revert operation is not actually done, and thus disk space need not be consumed for possible undoing purposes.

In one implementation, the user requests a revert preview operation for a given storage volume. If the storage volume is not the boot volume, then a dismount of the current volume occurs, followed by a remount of the storage volume with the snapshot volume, whereby the volume reappears with the data from the shadow copy. Any reads to the unchanged volume in the reverted state are thereafter satisfied by the shadow copy. To this end, a shadow copy driver essentially redirects read requests as necessary to volume locations corresponding to the selected shadow copy, rather than satisfying the requests from the current volume locations.

With respect to writes, a separate storage area is used by the snapshot driver to temporarily preserve the write data while the user operates in the revert preview mode. Any read requests that request data from storage locations that have been written (dirtied) while in the revert preview mode are satisfied from the corresponding separate storage area, while non-dirtied locations are read from corresponding the shadow copy locations. As a result, a cohesive, read-write volume is presented to the system. For efficiency, a table of volume offset pointers or the like may be maintained to reference locations on the storage volume where the actual write data is maintained. When the user exits the revert preview mode, any changes to the system may be discarded by cleaning up the separate storage area.

In the case of a revert preview of the boot volume, additional complexity needs to be handled, as a result of at least one file that frequently changes but is loaded before the shadow copy driver can perform its redirection; (indeed, this file includes the information needed to load the shadow copy driver). More particularly, contemporary operating systems have files that are loaded by a bootstrap program (a small program that is difficult to modify). The bootstrap program is responsible at boot time for loading certain core components of the operating system, which in turn are responsible for loading the rest of the operating system. As can be readily appreciated, only once the shadow copy driver has been loaded can the driver intercept read and write I/O calls, and redirect them as appropriate for the revert preview mode.

In order for a revert preview of the boot volume to work correctly, the bootstrap-loaded files need to correspond to the shadow copy that is being previewed. In most cases, the boot-loaded files do not change from one shadow copy to the next, so this is not a problem. An exception in Windows®-based operating systems is the system registry hive, which is a file that contains the list of boot-loaded files, and thus needs to be loaded by the boot loader so that the boot loader knows which other files to load. In Windows®-based operating systems, the system registry hive is continually changing because many components in the system are using it.

To use the correct system registry hive, an API is used to identify a file that may be substituted for the system registry hive at the next system boot. This mechanism allows the revert preview mechanism to specify the substitution of the registry hive that is on the selected shadow copy of the boot volume, so that the boot loader will load the corresponding system registry hive into memory for booting the shadow copy.

Other advantages will become apparent from the following detailed description when taken in conjunction with the drawings, in which:

BRIEF DESCRIPTION OF THE DRAWINGS

FIG. 5 is a block diagram comprising components for booting up a system, representing how a correct system registry hive corresponding to a shadow copy is loaded in revert preview mode before the shadow copy driver is loaded, in accordance with various aspects of the present invention.

DETAILED DESCRIPTION

Exemplary Operating Environment

Figure 1:
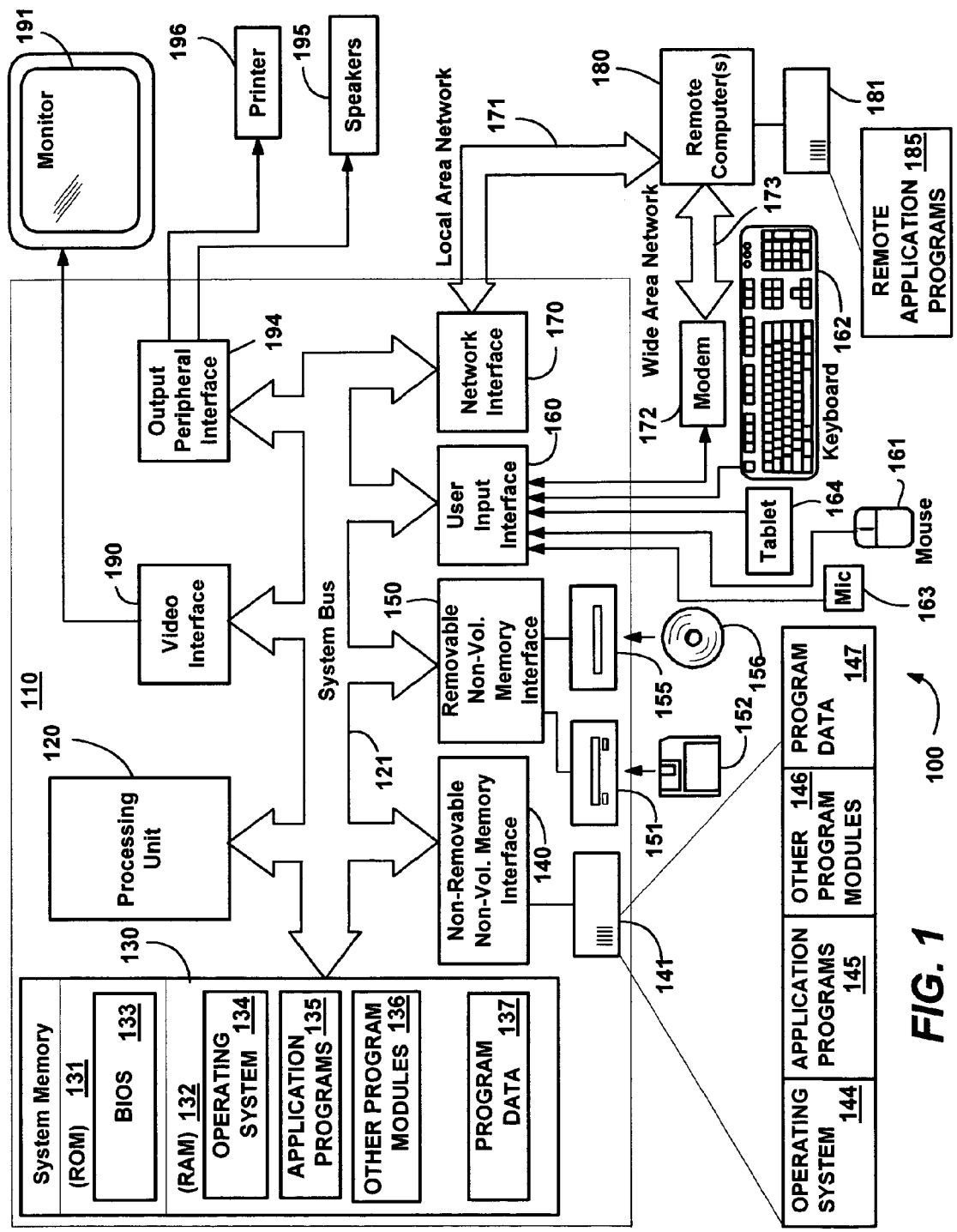
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Revert Preview

The present invention is generally directed towards a system and method by which a user receives a simulated preview of a revert to a prior state of a volume, without actually reverting to that state. As will be understood, this is accomplished by temporarily preserving writes received during the revert preview mode, and handling reads by returning writes from the temporary storage where they exist, or from a shadow copy of the volume where writes do not exist. As will be also understood, numerous ways to implement the present invention are feasible, and only some of the alternatives are described herein. For example, the present invention is primarily described below with reference to an example driver-type model in which a driver between the volume and the file system redirects requests made by the file system when appropriate. Notwithstanding, other types of arrangements are feasible. For example, the present invention may be configured to work in an architecture where the file system has built-in shadow copy technology. As such, the present invention is not limited to any particular examples used herein, but rather may be used various ways that provide benefits and advantages in computing in general.

Figure 2:
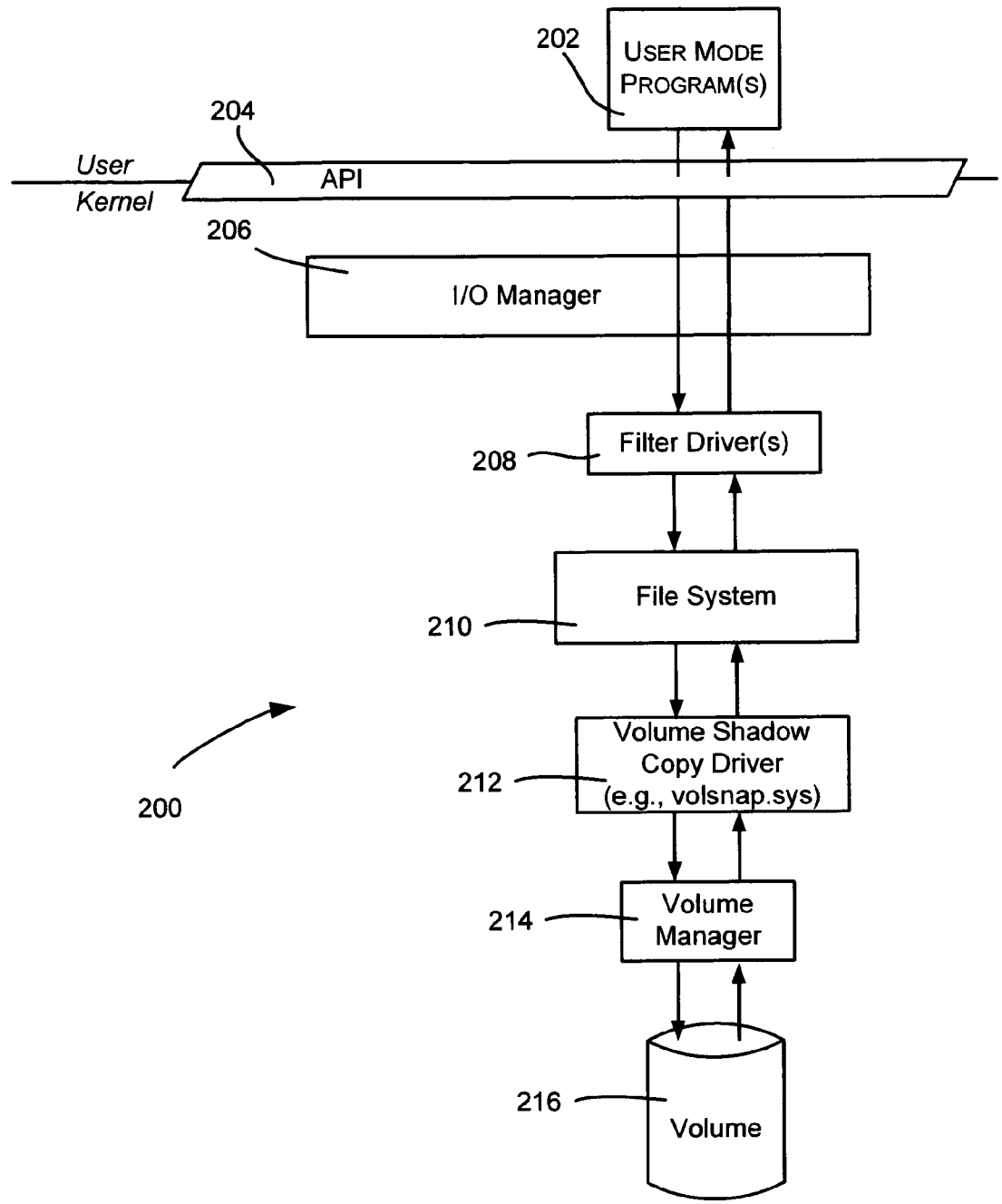
FIG. 2 is a block diagram comprising components for providing access to shadow copy volume data, including in a revert preview mode, in accordance with various aspects of the present invention.

Turning to FIG. 2, there is shown an example arrangement of components generally designated 200, in which user mode programs 202 make I/O requests through an API layer 404 to an I/O manager 206. In this example implementation, the I/O manager converts the request and its parameters into an I/O request packet, or IRP, which it sends towards the file system 210.

Before reaching the file system 210, one or more kernel mode filter drivers 208 may be present, and may intercept and process the IRP to perform some action, e.g., examine the data accompanying the request for virus signatures, encrypt the data, and so forth. Among other operations, filter drivers can also generate IRPs and send them to the file-system to perform file-related operations. Note that the filter drivers 208 may be arranged in a stack, however in other alternatives, the filter drivers may be managed by a filter manager (not shown) which passes IRPs to registered filter drivers in a controlled manner. FIG. 2 is intended to represent either of these alternatives, as well as others.

As is known, when an IRP requesting a read or write operation reaches the file system, the file system determines the volume to which the operation is directed, and a volume manager 214 that knows where the physical volume location is (possibly distributed across disks) further handles the read or write operation. Although not shown, networking components may also be present that allow file-related requests to be directed to network storage volumes.

In keeping with the present invention, before the request reaches the physical locations on the volumes, a shadow copy driver (e.g., a snapshot driver named volsnap.sys) has an opportunity to change the request to a corresponding shadow copy volume that the user has selected. In an example implementation described in the aforementioned U.S. Pat. No. 6,651,075, this is accomplished by the use of one or more differential files, each of which maintain allocation units for any changes made in a manner that allows an entire volume state at a given snapshot time to be recreated from earlier differential files and/or the base volume. Notwithstanding, the present invention may be used with other types of shadow copy mechanisms.

Figure 3:
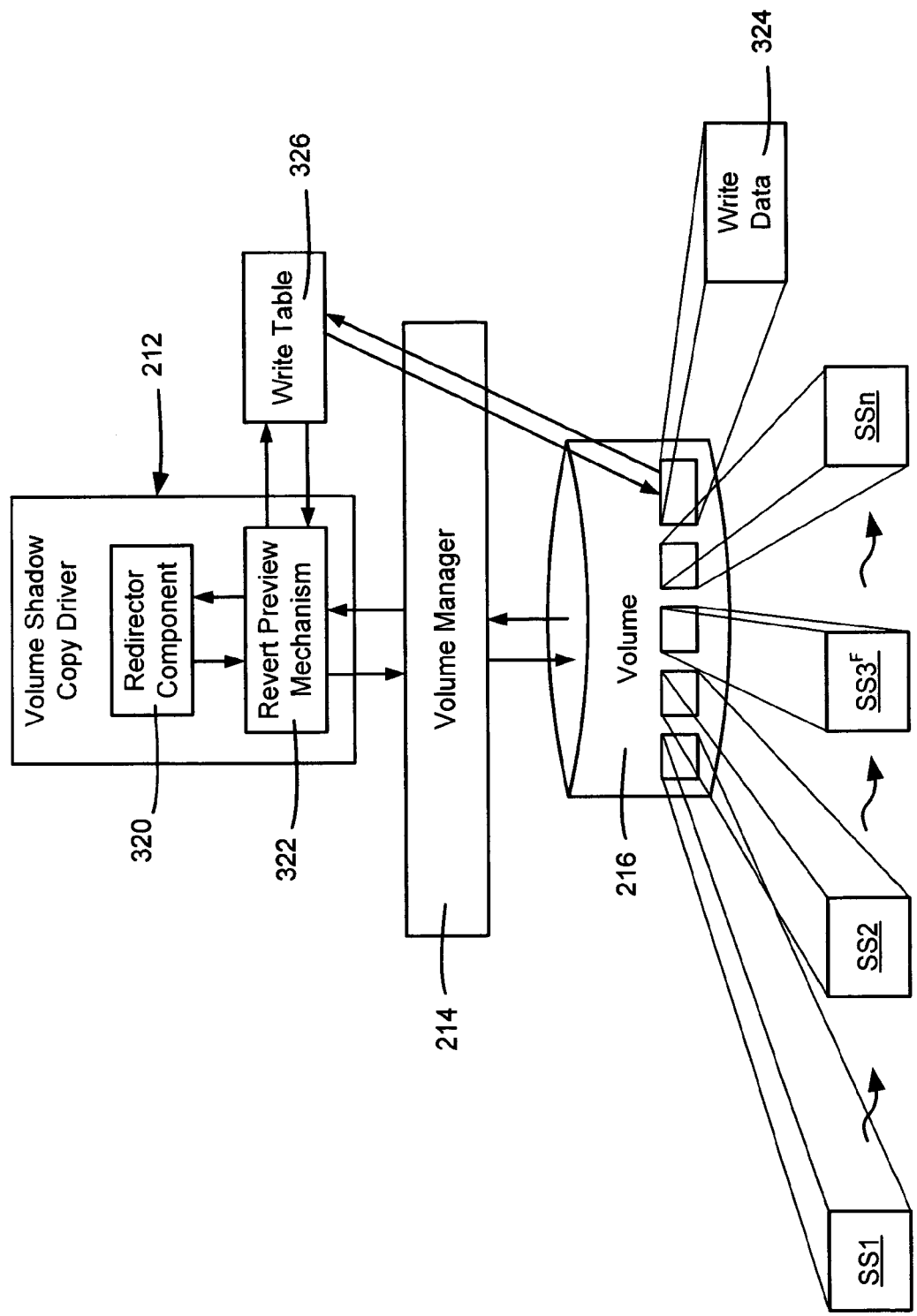
FIG. 3 is a block diagram comprising representations of shadow copy volumes, and a write table and its associated data for use in the revert preview mode, in accordance with various aspects of the present invention.

FIG. 3 shows a number of shadow copy (snapshot) volumes SS1-SSn on a base volume 216. Note that these may be logical volumes recreated from differential files, and that the differential files need not actually be stored on the base volume 216. In general, the user selects via a user interface or the like whether to use the current storage volume or a selected shadow copy volume.

In accordance with an aspect of the present invention, a redirector component 320 that can recreate a state of the storage volume at a particular earlier instance of a set of one or more earlier instances is provided, along with a revert preview mechanism 322. The redirector component 320 and revert preview mechanism 322 are shown in FIG. 3 as being incorporated into the volume shadow copy driver 212, but alternatively may be in a different configuration.

When a user selects a revert preview option, such as via a user interface, the driver 212 flags the selected prior volume state in some way, (such as along with the shadow copy data so as to survive a reboot), to know that any volume-directed operation needs to be handled in a revert preview operation, essentially by redirecting read requests to locations that are in one of the logical volumes. In FIG. 3, this flag is represented by the superscript "F" in the shadow copy labeled SS3. Once operational after a reboot, the driver may turn off this flag, so as to allow the user to exit the revert preview mode by another reboot, if necessary.

In accordance with an aspect of the present invention, unlike typical shadow copy technologies which are readonly (until a full revert) is performed, write requests are allowed in the revert preview mode. To this end, in one implementation, the revert preview mechanism 322 redirects the data 324 of write requests to free disk space, and maintains a write table 326 of volume offset pointers or the like to the write data locations 324, e.g., allocation units. One or more locked, mapped sections may be used to protect the contents. Also, the revert preview mechanism 322 may maintain a bitmap or the like to rapidly determine which allocation units were written, that is, are "dirtied" by changes.

In order to properly read back the data upon receiving a read request, the revert preview mechanism 322 includes logic that determines whether some or all of a read request corresponds to dirtied locations. For purposes of simplicity, the present invention will be primarily explained with reference to a read request that is satisfied from the write table or from the shadow copy of the volume, rather than from a combination of both. As will be understood, however, it is straightforward for the revert preview mechanism 322 to break up a read request into multiple read requests as necessary. For example, the revert preview mechanism 322 may read in (e.g., to a return buffer) data from any locations that were written, and then fill in any missing parts of the request with data from the shadow copy. Alternatively, the revert preview mechanism 322 may read in all of the requested data from the shadow copy, and then overwrite the data in the return buffer wherever it was written. In any event, writes are supported without changing the actual underlying shadow copy.

Figure 4:
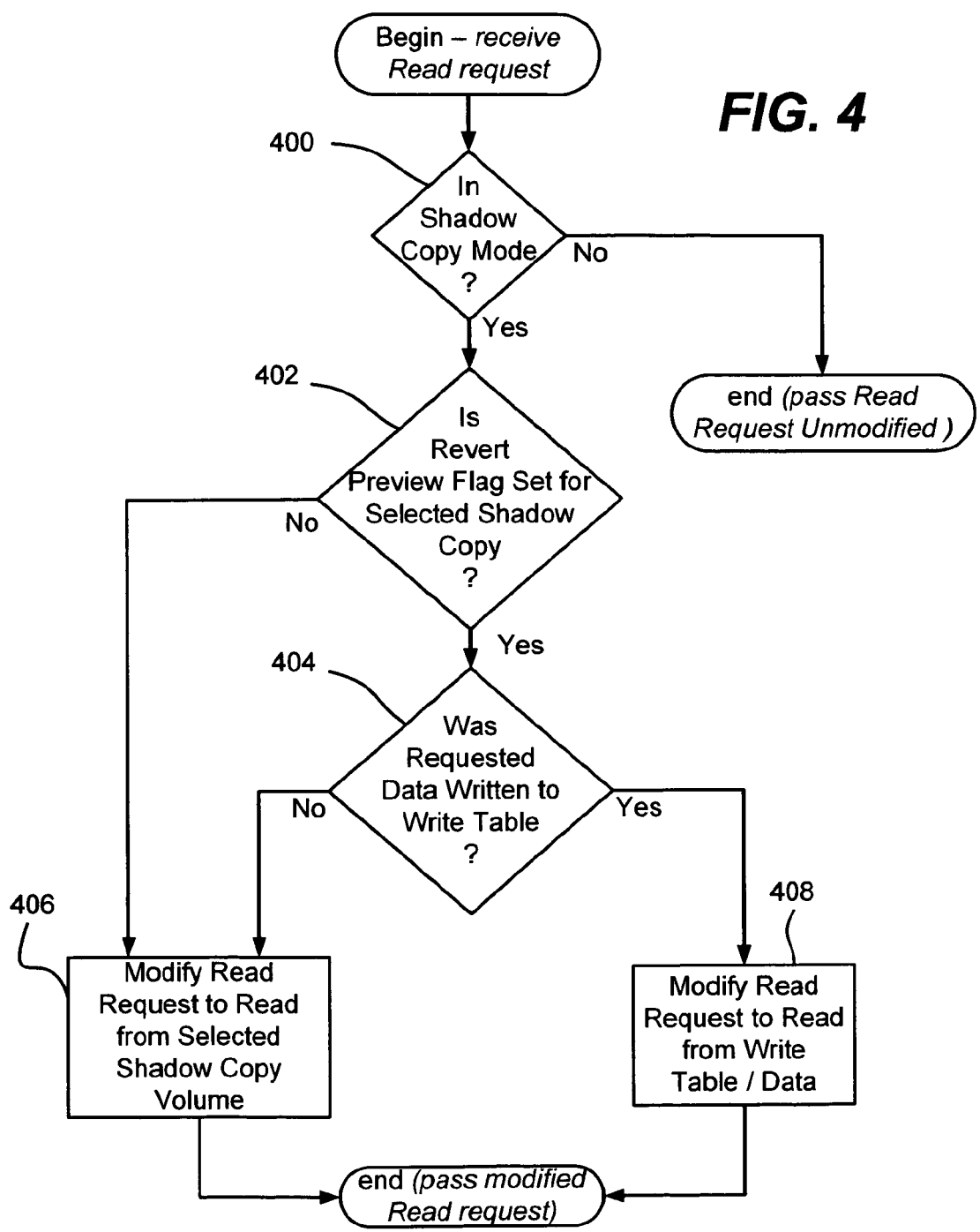
FIG. 4 is a flow diagram generally representing logic for handling a read request at the shadow copy driver, depending on the current operating mode and the state of the requested data, in accordance with various aspects of the present invention.

FIG. 4 shows general logic of the redirector component 320 and revert preview mechanism 322 with respect to handling a read request. In FIG. 4, step 400 tests whether the user has selected the shadow copy mode, which in the present example includes the revert preview mode. If not, the driver 212 is essentially disabled, and thus the read request is passed unmodified towards the volume, where the read request is handled as any normal volume read request.

Alternatively, if at step 400 the shadow copy mode has been selected, step 400 branches to step 402 where the revert preview mode flag (e.g., associated with the shadow copy volume as described above) is evaluated. If not set for this shadow copy, then the shadow copy is read-only, and thus the read request can be modified (in a known manner such as described in the aforementioned U.S. Pat. No. 6,651,075) to read from the shadow copy at step 406, because there are no writes involved.

If instead at 402 the revert preview flag was set, step 402 branches to step 404 where a check is made as to whether the read request corresponds to a location that was written while in the revert preview mode. If not, step 404 branches to step 406 to read from the shadow copy. Otherwise if the read request corresponds to a location that was written, step 404 branches to step 408 where the write table 326 is accessed to read in the correct location within the write data 324. Note that although not shown in FIG. 4, as described above, a read request that spans both written and non-written locations can be broken up into separate requests that are redirected as appropriate to retrieve the correct data, with changed data having precedence over unchanged data.

In this manner, a user is able to rapidly evaluate the consequences of a revert operation without committing to a full revert operation and/or requiring an undo. Typically the write table and write data is discarded when the user exits the revert preview mode.

Because via the revert preview mode of the present invention the user can make changes as if actually reverted, the user may be given some indication (e.g., a visual indication) that the user is in the revert preview mode, such as a different color scheme, a border around open windows and so forth. Otherwise the user (or a different user) may not know that the changes are temporary and be left in a state in which the user wants to exit the revert preview mode but has done work in this mode that will be lost upon exiting. In an alternative implementation, the present invention may be extended to keep the changes made in the revert preview mode; to this end, the change table and change data would need to be persisted. However, this would lead to situations in which data that was actually supposed to be from an earlier shadow copy was in fact more recent than later shadow copies. Thus, another alternative is to allow the changes could be kept, but only if the user actually reverted; in this case the change table and change data would be kept until used to overwrite actual volume locations following the conventional revert operation.

Another aspect of the present invention handles revert previews of the boot volume. As described above, in order to recreate the state of a boot volume and allow revert preview operations, it is necessary to redirect I/O requests to the data as it existed at the instant of the snapshot request. However, this causes a problem in that at least one file that frequently changes is loaded before the shadow copy driver can perform its redirection, and in fact includes the information needed to load the shadow copy driver 212.

More particularly, only once the shadow copy driver 212 has been loaded can the driver 212 intercept read and write I/O calls, and redirect them as appropriate for the revert preview mode. In order for a revert preview of the boot volume to work correctly, the various files, including boot-loaded files, need to correspond to the shadow copy that is being previewed. In most cases, the boot-loaded files do not change from one shadow copy to the next, so this is not a problem. An exception in Windows®-based operating systems is the system registry hive 538, which is a file that is continually changing because many components in the system use it. Moreover, the system registry hive 538 contains a list of other boot-loaded files, and thus needs to be loaded to determine other files to load.

As represented in FIG. 5, contemporary operating systems have files (e.g., following the master boot record MBR) that are loaded by a bootstrap program, e.g., the boot code 540 which comprises a small program that is difficult to modify. The bootstrap program 540 is responsible at boot time for loading certain core components of the operating system, which in turn are responsible for loading the rest of the operating system. In FIG. 5, this is shown as the boot code 540 loading the loader (LDR) code 542, which in turn loads the operating system kernel 544.

As can be readily appreciated, the system registry hive 538 identifies the shadow copy driver 212 and thus needs to be loaded before it, but there are different instances of the system registry hive for each shadow copy. To use the correct system registry hive, an API (e.g., RegReplaceKey) is used to identify a file to use for the system registry hive at the next system boot. This mechanism allows the revert preview mechanism to specify the substitution of the registry hive that is on the selected shadow copy of the boot volume, so that the boot loader will load the corresponding system registry hive into memory for booting the shadow copy. Thus, when a boot volume is selected for revert preview, the proper persisted instance of the system registry hive is located on the correct shadow copy, the file is copied to the volume with name that does not overwrite the current system registry hive, and the API is called to provide the new name. Thereafter, the user reboots into the revert preview mode, with the correct system registry hive loaded, along with the driver that redirects requests to the correct shadow copy and/or the write table/data. Note that unless the user exits the revert preview mode and again sets up the revert preview mode for the next reboot, the next reboot will result in the regular system registry hive being loaded, and the revert preview mode not in operation, so that a user can reboot out of any problem, if necessary.

As can be seen from the foregoing detailed description, there is provided a method and system that allows a user to evaluate the consequences of a revert operation, without needing to perform an actual revert operation. As a result, significant amounts of free disk space are not consumed for possible undoing of the revert, and the simulated revert is fast compared to a full revert operation.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method for evaluating the effects of a volume revert without actually performing a volume revert operation, the method comprising:
   receiving a request to preview a volume revert operation that corresponds to reverting from a current state of a storage volume to an earlier state of the storage volume;
   changing to a revert preview mode in response to the request, including separately maintaining write data corresponding to write requests, and handling read requests by accessing the write data for data that has been written or accessing shadow copy data corresponding to the earlier state of the storage volume for data that has not been written;
   storing at least some of the write data corresponding to write requests, such that upon exiting the revert preview mode, the write data is configured to replace the current state storage volume data corresponding to the write data; and
   overwriting at least a portion of current state storage volume data with write data corresponding to at least one of the write requests received during the revert preview mode.

2. The method of claim 1 wherein maintaining the write data comprises writing data to free storage and maintaining pointers to that write data.

3. The method of claim 1 wherein changing to the revert preview mode further includes providing a visual indication to indicate that the revert preview mode is active.

4. The method of claim 1 further comprising, exiting the revert preview mode.

5. The method of claim 4 further comprising cleaning up from the revert preview mode, including discarding the separately maintained write data.

6. The method of claim 4 wherein changing to the revert preview mode further includes providing a visual indication to indicate that the revert preview mode is active, and wherein exiting the revert preview mode includes modifying the visual indication to indicate that the revert preview mode is not active.

7. The method of claim 1 wherein the storage volume comprises a boot volume of a computer system in the computing environment, and further comprising, identifying a set of at least one file that is needed for changing to an earlier state of the storage volume such that the set will be loaded upon reboot, and rebooting the computer system.

8. At least one recordable-type computer-readable medium having computer-executable instructions, which when executed perform the method of claim 1.

9. In a computing environment including a storage volume, a system for evaluating the effects of a volume revert without actually performing a volume revert operation, the system comprising:
   a redirector component that can recreate a state of the storage volume at a particular earlier instance of a set of one or more earlier instances;

a revert preview mechanism that operates during a revert preview mode to preview a revert operation, including working with the redirector copy component to recreate a state of the storage volume at a particular earlier instance including separately maintaining write data corresponding to write requests, and handling read requests by accessing the write data for data that has been written or accessing shadow copy data corresponding to the earlier state of the storage volume for data that has not been written;

a storing mechanism configured to store at least some of the write data corresponding to write requests, such that upon exiting the revert preview mode, the write data is configured to replace the current state storage volume data corresponding to the write data; and an overwriting mechanism configured to overwrite at least a portion of current state storage volume data with write data corresponding to at least one of the write requests received during the revert preview mode.

10. The system of claim 9 wherein the redirector component and the revert preview mechanism are incorporated into a driver.

11. The system of claim 10 wherein the driver is loaded to intercept communications between the file system and the storage volume.

12. The system of claim 9 wherein the revert preview mechanism maintains the updated data by maintaining a table of pointers to the updated data.

13. The system of claim 9 wherein the storage volume comprises a boot volume.

14. At least one recordable-type computer-readable medium having computer-executable instructions, which when executed perform steps, comprising:

receiving a request to preview a volume revert operation that corresponds to reverting from a current state of a storage volume to an earlier state of the storage volume;

changing to a revert preview mode in response to the request, including separately maintaining write data corresponding to write requests, and handling read requests by accessing the write data for data that has been written or accessing shadow copy data corresponding to the earlier state of the storage volume for data that has not been written;

storing at least some of the write data corresponding to write requests, such that upon exiting the revert preview mode, the write data is configured to replace the current state storage volume data corresponding to the write data; and overwriting at least a portion of current state storage volume data with write data corresponding to at least one of the write requests received during the revert preview mode.

15. The recordable-type computer-readable medium of claim 14 wherein separately maintaining the updated data comprises writing data to free storage and maintaining pointers to that write data.

16. The recordable-type computer-readable medium of claim 14 further comprising discarding the separately maintained updated data upon providing access to data corresponding to another state of a storage volume.

17. The recordable-type computer-readable medium of claim 14 further comprising saving at least some of the updated data upon providing access to data corresponding to another state of a storage volume.

18. The recordable-type computer-readable medium of claim 14 further comprising, identifying a set of at least one file that is needed for providing access to data corresponding to an earlier state of a storage volume, such that the set will be loaded upon reboot, and rebooting the computer system.

* * * * *